July 7, 1925.
W. LAMBERT
SEWER PIPE RAM
Filed Nov. 12, 1923
1,544,912
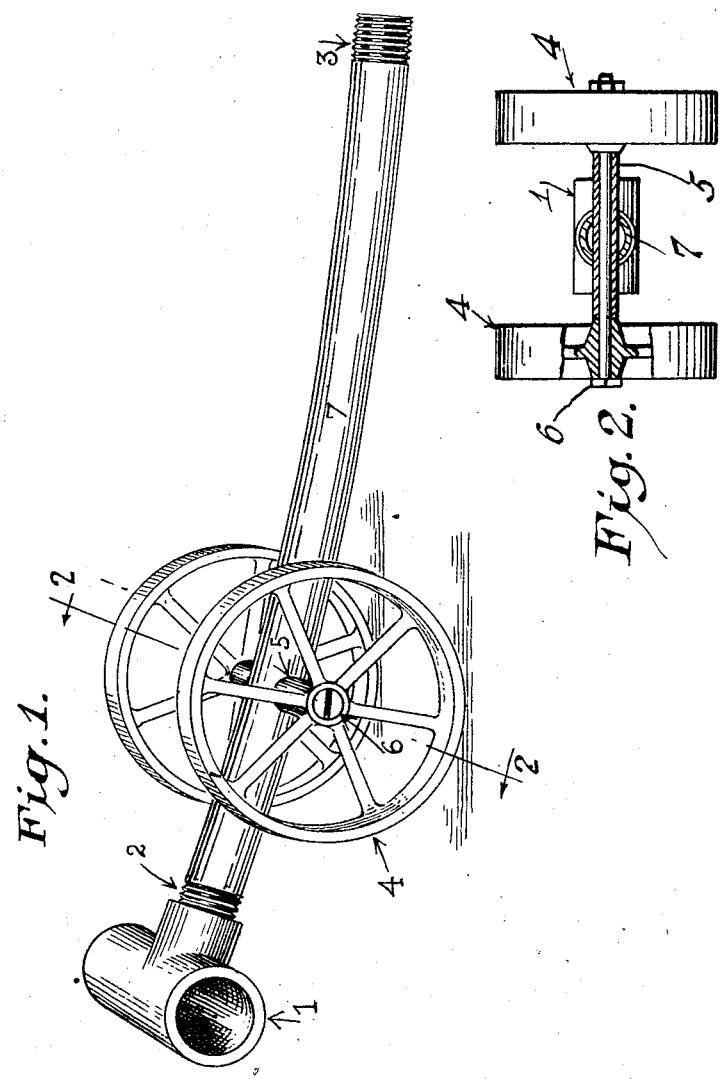
Inventor
W. Lambert.
By C. A. O'Brien.

Patented July 7, 1925.

1,544,912

UNITED STATES PATENT OFFICE.

WILLIAM LAMBERT, OF EAST POINT, GEORGIA.

SEWER-PIPE RAM.

Application filed November 12, 1923. Serial No. 674,395.

*To all whom it may concern:*

Be it known that I, WILLIAM LAMBERT, a citizen of the United States, residing at East Point, in the county of Fulton and State of Georgia, have invented a new and useful Sewer-Pipe Ram.

The following is the specification:

This invention relates to an improved device, which may be conveniently referred to as a sewer pipe ram.

The invention relates to devices of this class, which are of the type for alternate reciprocation, in the sewer pipe, the device being provided with a plunger head for striking the obstruction to move it, and being of hollow formation to simultaneously admit a stream of water, for assisting in dislodging the obstruction.

It is my object to generally improve upon devices of this class by providing one of extreme simplicity and durability, which may be made from common elements, such as pipe sections, fittings, bolts and the like.

The features and advantages of the invention will become apparent from the following description and drawings.

In the accompanying drawings, forming a part of this application, and in which like numerals are employed to designate like parts throughout the same:

Figure 1 represents a perspective view of a ram constructed in accordance with the present invention.

Figure 2 is a transverse sectional view, taken approximately on the line 2—2 of Figure 1.

Specifically described, the improved device comprises a length of pipe 7, which is threaded at its opposite ends, as indicated at 2 and 3 respectively. At 2, the pipe is connected with the short branch of a T-fitting 1. At its opposite end, the pipe is adapted to be connected to additional pipe sections or to suitable driving rods. Between its ends, the pipe 7 is provided with a transverse hole, which in the present instance accommodates a short pipe 5, which constitutes a bushing. In practice, the bushing will be connected with the pipe, in a manner to afford a fluid tight joint. The bushing constitutes a bearing for the axle 6, which is simply in the form of a common bolt and nut. The axle in turn, serves to connect the pair of wheels 4 with the intermediate portion of the pipe. The ends of the bushing serve to space the wheels the proper distance from the pipe, to insure balancing of the structure.

In practice, the T-head 1 is inserted into the clogged pipe, and the device is worked back and forth, to dislodge the obstruction, by utilizing the head as a plunger.

In the foregoing description, taken in connection with the accompanying drawing, will enable the reader to thoroughly comprehend the invention. Therefore, a more lengthy description is deemed unnecessary.

I claim:

A sewer pipe ram comprising a single length of pipe externally screw threaded at its opposite ends and provided intermediate its ends with a transverse hole, a transversely disposed bushing fitted into said hole and having its ends disposed beyond opposed sides of said pipe, an axle journalled in said bushing, wheels carried by the ends of the axle, and a T-coupling fitted on the outer screw threaded end of said pipe.

In testimony whereof I affix my signature.

WILLIAM LAMBERT.